United States Patent [19]

Aoki et al.

[11] 4,093,776

[45] June 6, 1978

[54] PROCESS FOR PREPARATION OF SPONTANEOUSLY-CROSSLINKED ALKALI METAL ACRYLATE POLYMERS

[75] Inventors: Shuzo Aoki, Ito; Harumasa Yamasaki, Wakayama, both of Japan

[73] Assignee: Kao Soap Co., Ltd., Tokyo, Japan

[21] Appl. No.: 836,058

[22] Filed: Sep. 23, 1977

[30] Foreign Application Priority Data

Oct. 7, 1976  Japan .................................. 51-120591

[51] Int. Cl.$^2$ ..................... C08F 120/06; C08F 2/32
[52] U.S. Cl. .............................. 428/402; 260/23 AR; 260/29.6 H; 526/16; 526/207; 526/240; 526/909
[58] Field of Search ............... 526/207, 909, 240, 16; 428/402, 407; 260/23 AR

[56] References Cited

U.S. PATENT DOCUMENTS

| | | | |
|---|---|---|---|
| 2,956,046 | 10/1960 | Glavis et al. ..................... | 526/240 |
| 3,657,378 | 4/1972 | Volk et al. ........................ | 526/240 |
| 3,719,647 | 3/1973 | Hardy et al. ..................... | 526/240 |
| 3,764,502 | 10/1973 | Restaino et al. ................. | 526/240 |
| 3,857,768 | 12/1974 | Kagiya et al. ................... | 526/16 |
| 3,926,891 | 12/1975 | Gross et al. ..................... | 526/16 |
| 3,948,740 | 4/1976 | Phalangas ........................ | 526/240 |
| 3,957,739 | 5/1976 | Cabestany et al. ............. | 526/207 |
| 4,041,228 | 8/1977 | Gross ................................ | 526/240 |
| 4,057,521 | 11/1977 | Gross ................................ | 526/240 |
| 4,059,552 | 11/1977 | Zweigle et al. ................. | 526/207 |

*Primary Examiner*—Herbert J. Lilling
*Attorney, Agent, or Firm*—Blanchard, Flynn, Thiel, Boutell & Tanis

[57] ABSTRACT

Spontaneously cross-linked alkali metal acrylate polymers having a high water-absorbing property and which are safe for contact with the human skin are prepared by a water-in-oil suspension polymerization process, using a sorbitan fatty acid ester having an HLB value of 3 to 6 as a dispersing agent.

7 Claims, No Drawings

PROCESS FOR PREPARATION OF SPONTANEOUSLY-CROSSLINKED ALKALI METAL ACRYLATE POLYMERS

BACKGROUND OF THE INVENTION

1. Field of the Invention

The present invention relates to a process for the preparation of spontaneously crosslinked alkali metal acrylate polymers having a high water-absorbing property and a high sanitary safety.

2. Description of the Prior Art

Paper products for absorbing excretions from human bodies, such as sanitary napkins and paper diapers, have been used for many years, but their properties are not completely satisfactory. Most of the defects of these paper products are due to the insufficient water-absorbing property of the paper. In paper, water is absorbed in clearance spaces between fibers by capillary action. Accordingly, as the amount of water absorbed increases, the bulk of the paper becomes extremely large. Further, the majority of the absorbed water is squeezed out by application of external pressure.

As products intended for overcoming this defect, there have heretofore been proposed various composite products formed by combining a water-absorbing polymer with paper, pulverized pulp, absorbent cotton or the like. For example, U.S. Pat. No. 3,670,731 discloses that a low bulk product having a high water-absorbing property even under the application of external pressure, is prepared by distributing a partially crosslinked acrylamide-sodium acrylate copolymer in an absorbent material.

The water-absorbing polymer that can be used in this field is obtained by partially cross-linking a water-soluble polymer so that the resulting polymer can be swollen by water, but it does not dissolve in water. In view of the intended use, the water-absorbing polymer must be sanitary and safe for contact with the human body, and it is required that the water-absorbing polymer can be manufactured at a low cost.

In general, as disclosed in U.S. Pat. No. 3,669,103, water-swellable but water-insoluble polymers, such as partially crosslinked polyacrylamide and poly(alkali metal acrylate), that can be used as water-absorbing polymers, are prepared by radical copolymerization of an aqueous solution of a corresponding monomer and a crosslinking monomer such as a divinyl or diallyl compound. The resulting massive hydrous gel is dried and then pulverized. Further, a water-soluble polymer prepared in advance may be crosslinked by radiation.

As an example of a water-soluble polymer having a high sanitary safety that can be used in the above-mentioned field, namely a basic skeleton of a water-absorbing polymer, there can be mentioned poly(sodium acrylate), which is permitted for use as a food additive. In order to obtain a water-absorbing polymer, this polymer must be crosslinked. It is not preferred to copolymerize sodium acrylate using a divinyl or diallyl compound as the crosslinking monomer because the sanitary safety of a polymer prepared in that way has not been proved. Post-crosslinking by radiation is excellent from the viewpoint that an extraneous chemical compound is not introduced into the polymer. However, in the latter case, complicated preparation equipment is required, and the preparation process involves a large investment and the manufacturing cost is extremely high.

It is known that in the polymerization of acrylic acid or sodium acrylate, a partially or highly crosslinked polymer can be prepared under some preparation conditions. For example, it is reported that in the aqueous solution polymerization of sodium acrylate, because the monomer concentration is high, at a pH of 4 to 6 the induction period is very long and after this long induction period, rapid polymerization accompanied with bumping due to accumulation of the heat of polymerization takes place and the entire mixture is converted to a granular gel which is poorly soluble in water (see "Acrylic Acid and Its Polymer," volume I, page 51, written by Eizo Ohmori and published by Shokodo in 1973). It is also reported that a polymer obtained by water-in-oil emulsion polymerization of acrylic acid is partially insoluble in water (see Japanese Patent Publication No. 10644/59). However, the primary object of these known processes is to obtain a soluble poly(sodium acrylate). In these processes, the crosslinking reaction is an abnormal and unwanted reaction, and it is one of the technical problems in the conventional polymerization processes to devise procedures to eliminate the occurrence of such abnormal crosslinking reaction.

We have noted this abnormal reaction and searched for polymerization conditions effective to cause such abnormal reaction to occur on a reliable, reproducible basis so that poly(sodium acrylate) can be uniformly and spontaneously crosslinked so as to produce a polymer product having a high swelling property but containing only a very small water-soluble portion.

More specifically, we prepared polymers according to the teachings of the above textbook reference and Japanese patent publication. As described in the Comparative Examples given hereinafter, the degree of swelling of a polymer obtained by aqueous solution polymerization at a high concentration of sodium acrylate is not very high and the amount of the water-soluble portion of the polymer is large. In other words, the polymer is highly sticky when it is dispersed in water. Moreover, since this reaction progresses very vigorously and rapidly, it is very difficult to conduct this polymerization process on an industrial scale while controlling the reaction appropriately. In the case of the water-in-oil emulsion polymerization of acrylic acid, the resulting polymer is obtained in the state of a dispersion in water, and when it is neutralized with sodium hydroxide, a large quantity of a water-soluble polymer portion is formed and the resulting product is not satisfactory as a water-absorbing polymer. At any rate, in view of the intended use of the polymer, a water-absorbing polymer must be substantially neutral, and the resulting polyacrylic acid must be neutralized with an alkaline substance. Therefore, in the process in which a crosslinked polyacrylic acid is prepared and it is then neutralized, a gel having a high viscosity must be treated and it must be pulverized. However, the steps of removing the solvent and water from a highly viscous gel and pulverizing and powdering the resulting solid are quite difficult and disadvantageous from the industrial viewpoint.

SUMMARY OF THE INVENTION

We have discovered that under specific conditions, namely, by adopting a water-in-oil suspension polymerization process in which the polymerization is carried out by suspending and dispersing an aqueous solution of an alkali metal acrylate having a high concentration of said alkali metal acrylate of at least 40% by weight, in an organic solvent, in the presence of a water-soluble radical polymerization initiator, a spontaneously cross-linked polymer of said alkali metal acrylate having a very high swelling property, namely a very high water-absorbing property, but having a very low proportion of a water-soluble polymer portion, can be stably prepared in a powder state. Based on this finding, we have now completed the present invention.

The technique of water-in-oil polymerization as disclosed mainly for the preparation of acrylamide polymers and acrylamide copolymers in Japanese Patent Publication No. 10644/59, Japanese Patent Application Laid-Open Specification No. 1082/73, Japanese Patent Application Laid-Open Specification No. 41090/76 and Japanese Patent Application Laid-Open Specification No. 47937/76 can be employed in the process of the present invention.

In the process for preparing polymers of alkali metal acrylates according to the present invention, because neutralization of the polymer is difficult after the polymer has been formed, the acrylic acid must be neutralized with an alkali metal hydroxide before initiation of polymerization so that the resulting polymer is neutral. The degree of neutralization of the acrylic acid, that is, the percentage of carboxyl groups of acrylic acid that are converted to carboxylate groups, is 50 to 95%, preferably 65 to 75%.

In the present invention, it is critical that the organic medium used as the oil phase is an aliphatic hydrocarbon, preferably having a boiling point of 30° to 200° C. For example, n-hexane and ligroin are preferably employed. A particularly preferred organic solvent is n-hexane. In order to attain the intended object of the present invention, it is critical that the suspension polymerization must be conducted in the water-in-oil suspension state so that after the suspension polymerization is completed, the polymer is obtained in the form of a non-sticky powder having a particle size of 0.01 to 0.12 mm. It is important, for conducting the suspension polymerization in such a state, that a liquid organic medium be used as the oil phase for the suspension polymerization and that a surface active agent be used for dispersing the aqueous solution of the alkali metal acrylate monomer in the oil phase. It is critical that an aliphatic hydrocarbon is used as the oil phase, as pointed out hereinbefore, and the object of the present invention cannot be attained when an aromatic solvent is used. More specifically, when an aromatic solvent such as benzene, toluene, xylene or the like is used and a sorbitan fatty acid ester having an HLB value of 3 to 6, for example, sorbitan monostearate, is used as a surface active agent for promoting formation of a W/O type emulsion, the resulting polymer is gelled and it cannot be powdered at all. It is believed that the reason is that the aromatic solvent is inferior to the liquid aliphatic hydrocarbon medium in the property of sufficiently stabilizing the suspension phase, that the aromatic solvent has a high capacity of dissolving the resulting polymer and that it dissolves parts of the resulting polymer particles and promotes fusion and cohesion of the polymer particles.

All of the water-soluble radical polymerization initiators customarily used for emulsion polymerization are suitable for use in the present invention. For example, there can be mentioned water-soluble peroxides such as potassium persulfate, ammonium persulfate and hydrogen peroxide. These initiators can be combined with reducing substances such as sulfites or amines to form known redox type initiators.

The polymer prepared according to the process of the present invention is pulverized in the final step. In order to achieve efficient pulverizaton of the resulting polymer, it is critical that the polymerizaton should be carried out in an aqueous phase according to the water-in-oil polymerization technique. Therefore, the polymerization initiator used must be water-soluble, and the use of an oil-soluble radical polymerization initiator is not suitable in the present invention. More specifically, when an oil-soluble initiator is used as the polymerization initiator, radicals are formed in the oil phase, and oil solution polymerizaton and W/O type emulsion polymerization take place concurrently. Accordingly, the entire reaction mixture becomes gelled and the powdered polymer desired as a final product in the present invention cannot be obtained at all. Among the known water-soluble initiators, potassium persulfate and ammonium persulfate are preferred in view of their polymerization-initiating activity.

A non-ionic surface active agent having an HLB value of 3 to 6 is used as the oil-soluble surface active agent that is used for dispersing and suspending an aqueous solution of an alkali metal acrylate in the organic solvent. Such a surface active agent that is solid at room temperature is preferred. A surface active agent that is solid at room temperature does not change the surface condition of the resulting polymer and prevents the occurrence of undesirable phenomena such as adhesion of polymer particles or formation of agglomerates of polymer particles. In the present invention, the use of a sorbitan fatty acid ester that is solid at room temperature, especially sorbitan monostearate, is preferred. When a surface active agent having an HLB value larger than 6 is used, a W/O type emulsion cannot be stably formed. When a surface active agent having an HLB value smaller than 3 is used, even though a W/O type emulsion may be formed, because the surface active agent per se is oily, it adheres to the surfaces of the resulting polymer particles to render them sticky, and a non-sticky polymer that can be handled with ease cannot be obtained. Accordingly, the use of a surface active agent having too large or too small an HLB value is not suitable for use in the present invention.

We found that the concentration of the aqueous solution of the alkali metal acrylate to be subjected to polymerization has a very close relation to the degree of crosslinking or the degree of swelling in the resulting polymer. A higher concentration of the aqueous solution of the alkali metal acrylate results in a higher degree of crosslinking or swelling. In general, the concentration of the alkali metal acrylate is maintained at at least 40% by weight, and preferably is maintained at the saturated concentration. The saturated concentration of sodium acrylate having a neutralization degree of 75% in water is about 45% by weight at room temperature. If polymerization is conducted at such a high concentration of the alkali metal acrylate, a crosslinked polymer can be obtained without using a crosslinking agent which is ordinarily required for obtaining a crosslinked polymer.

In practicing the process of the present invention, the ratio of the amount of the aqueous solution of the monomer to the amount of the aliphatic hydrocarbon oil phase can be varied in a broad range. In general, when the amount of the oil phase is relatively small, there is attained the advantage that the amount of the monomer that can be charged in the reaction vessel for a one-batch reaction can be increased, but it becomes difficult to remove the heat generated by the reaction. Therefore, the above-mentioned quantitative ratio of aqueous solution of alkali metal acrylate to aliphatic hydrocarbon oil phase is determined depending on the heat-removing capacity of the reaction vessel. In general, a quantitative volume ratio of aqueous phase to oil phase ranging from 1 : 1 to 1 : 4 is preferred. Removal of the heat generated by the reaction can be facilitated by adding the aqueous solution of the monomer in lots to the oil phase.

The polymerization initiator is used in an amount of 0.01 to 1% by weight, based on the weight of the alkali metal acrylate monomer. The polymerization is carried out at 30° to 80° C, preferably 50° to 70° C.

A preferred amount of the surface active agent is in the range of 1 to 10% by weight, based on the weight of the alkali metal acrylate monomer. The particle size of the resulting polymer is determined by the amount incorporated of the surface active agent.

The polymerization according to the present invention is conducted in the following manner.

An initiator is incorporated and dissolved in the aqueous solution of the monomer which has been neutralized in advance. The aqueous solution is mixed in a solution of a surface active agent in the oil phase. Nitrogen gas is introduced into the mixture under agitation to expel oxygen from the reaction system, during which time the aqueous solution phase in the reaction mixture is converted to fine liquid droplets and these droplets are dispersed and suspended in the oil phase. Then, the reaction mixture is heated at a predetermined temperature to initiate polymerization. The reaction mixture is appropriately heated or cooled depending on the heat generated by the reaction. The polymerization reaction advances in the fine liquid droplets of the aqueous phase, and when agitation is stopped after completion of the reaction, the resulting water-swollen polymer particles are precipitated. The precipitated polymer particles are separated from the oil phase by decantation, filtration or centrifugal separation and they are then dried. Alternatively, a dried polymer can be directly obtained by removing the oil phase and water by distillation.

The particle size of the thus-obtained polymer is very small and is ordinarily in the range of 0.01 to 0.12 mm, although the particle size differs to some extent depending on the amount used of the surface active agent. The resulting polymer is a powder consisting of truly globular primary particles having their surfaces coated with the surface active agent or of such primary particles and a small quantity of secondary particles formed by agglomeration of primary particles. Such secondary particles can easily be pulverized into finer particles by application of a slight mechanical force. This feature is very advantageous in view of both the preparation and intended use of the polymer. More specifically, when a polymer gel is prepared according to customary aqueous solution polymerization and the polymer gel is dried, because the polymer is not in the powdery state, a very large mechanical force is necessary for pulverizing the dried polymer, and it is very difficult to obtain a fine powdery product.

Since the surfaces of the polymer particles obtained according to the process of the present invention are coated with the oil-soluble surface active agent, there is attained the advantage that adhesion of the particles to one another does not occur to a significant degree. Moreover, when the dry polymer is dispersed in water again and the resulting creamy product is dried, the polymer is recovered in the powdery state without agglomeration. This means that a wet method can be employed for preparing a composite product of a paper or non-woven fabric by utilizing this polymer. In contrast, when a polymer prepared according to the customary aqueous solution polymerization is dispersed in water and then dried, polymer particles adhere to one another to form large agglomerates.

The polymer obtained according to the process of the present invention consists essentially of a homopolymer of an alkali metal acrylate and does not contain any additional different monomer units. Further, the oil-soluble surface active agent used as the dispersion stabilizer at the time of polymerization and which finally remains of the surfaces of the dried polymer particles is a sorbitan fatty acid ester which is safe for contact with human bodies as shown by the fact that it is allowed as a food additive. Still further, when a purified petroleum-type aliphatic hydrocarbon, for example, n-hexane of the food additive grade such as is used for extraction of an edible oil, is used as the oil phase in the polymerization step, if a minute amount of it remains in the resulting polymer, it does not degrade the sanitary safety of the polymer at all. Still in addition, the polymer obtained according to the present invention has the characteristic property that when it contacts water, it absorbs a large quantity of water, for example, at least 400 g of water per g of the polymer.

The water absorption referred to in the instant specification is determined according to the following method.

A beaker having an inner capacity of 1 liter is charged with about 1 g of the polymer and 720 g of deionized water, and the contents are weakly agitated so that the polymer is sufficiently dispersed in water but the polymer chain is not broken. The dispersion is allowed to stand still at room temperature for 30 minutes to swell the polymer sufficiently, and the dispersion is filtered by an 80-mesh metal screen. The weight of the thus recovered polymer is measured and the obtained value is divided by the original weight of the polymer. The thus-obtained value is defined as the water absorption in the present invention.

In the present invention, the particle size is determined based on a microphotograph taken at 50 magnification by a highest grade biological microscope manufactured by Olympus Co.

In the present invention, it is preferred that the starting alkali metal acrylate be neutralized so that the resulting polymer is neutral. As the alkali metal hydroxide to be used for neutralizing acrylic acid, there can be mentioned, for example, sodium hydroxide, potassium hydroxide and lithium hydroxide. Sodium hydroxide which provides a polymer having no mutual reaction with living bodies is most preferred.

A preferred embodiment of the present invention will now be described.

An aqueous solution of sodium acrylate of a neutralization degree of 65 to 75%, which solution has a concentration of 40 to 45% by weight and contains potassium persulfate in an amount of 0.01 to 1% by weight, based on the sodium acrylate, is dispersed, suspended and polymerized in n-hexane in the presence of sorbitan monostearate. Then, n-hexane and water are removed by distillation to obtain a powdery poly(sodium acrylate) having an excellent water-absorbing property and a high sanitary safety.

The present invention will now be described in detail by reference to the following Examples and Comparative Examples.

COMPARATIVE EXAMPLE 1

An aqueous solution formed by dissolving 80.4 g of sodium hydroxide having a purity of 93% in 232 ml of water was added to 180 g of acrylic acid to effect neutralization. The solution was cooled to room temperature and 0.6 g of potassium persulfate was incorporated and dissolved in the aqueous solution. The pH value of the resulting solution was 5.7. The solution was flowed into a stainless steel tray having a height of 20 cm and a cross-sectional area of 25 $cm^2$. The top portion of the tray was covered with a thin polyethylene film and nitrogen gas was introduced in a space in the upper portion of the tray to expel oxygen. This tray was floated on a water bath maintained at 60° C. When the temperature of the reaction mixture reached 60° C, the reaction was immediately started to effect rapid polymerization accompanied with bumping. The reaction mixture was allowed to stand in this state for 1 hour. The resulting rubbery gel was taken out of the tray and finely cut by a knife. The cut polymer pieces were dried overnight at 70° C in a hot air oven. Then, the polymer pieces were pulverized in a mortar so as to obtain a powdery produce capable of passing through a 60-mesh sieve.

The water absorption of the thus-formed polymer determined according to the above-mentioned method was about 250. Further, during the measurement, the swollen gel was highly sticky, and the filterability was poor.

COMPARATIVE EXAMPLE 2

To the same starting solution as used in Comparative Example 1 there was further added a solution formed by dissolving 0.3 g of potassium metabisulfite in 8 ml of water after addition of potassium persulfate. The polymerization was carried out under the same conditions as described in Comparative Example 1 except that the temperature of the water bath was maintained at 25° C and the polymerization time was adjusted to 4 hours. The reaction was started without any substantial induction period and the maximum temperature was 30° C. The resulting polymer took a rubbery gel-like form.

The water absorption of the resulting polymer determined in the same manner as described in Comparative Example 1 was only about 180. The swollen gel was highly sticky and the filterability was poor.

COMPARATIVE EXAMPLE 3

A 500 ml-capacity four-neck round-bottomed flask equipped with an agitator, a reflux condenser, a dropping funnel and a nitrogen inlet was charged with 175 g of xylene and 17.5 g of sorbitan monostearate, and the sorbitan monostearate was dissolved in the xylene. Then, 0.35 g of benzoyl peroxide was incorporated and dissolved in the solution. Then, a solution formed by dissolving 37.5 g of acrylic acid in 37.5 g of water was added to and emulsified in the xylene solution. Nitrogen gas was blown into the flask to expel oxygen therefrom and the reaction mixture was heated at 60° to 65° C for 8 hours. The resulting polymer was separated and dried. The polymer was insoluble in water, but when it was placed into an aqueous solution of sodium hydroxide for neutralization, the polymer was substantially dissolved and a highly viscous solution containing only a very small amount of an insoluble portion was obtained.

From the results obtained in this Comparative Example, it will readily be understood that when a 50% aqueous solution of acrylic acid is polymerized in xylene in the presence of an oil-soluble radical polymerization initiator, a water-insoluble polymer is obtained but it is dissolved in an alkaline aqueous solution, and the self-crosslinked swellable polymer desired in the present invention cannot be obtained at all.

EXAMPLE 1

The same flask as used in Comparative Example 3 was charged with 228 ml of n-hexane of the food additive grade, and 1.8 g of sorbitan monostearate was added and dissolved in the n-hexane. Nitrogen gas was blown into the flask to expel dissolved oxygen. Separately, 30 g of acrylic acid was added to an alkali solution prepared from 39 g of water and 13.4 g of 93% sodium hydroxide in an Erlenmeyer flask while cooling the flask with ice from the outside, whereby 75% of the carboxyl groups of the acrylic acid were neutralized. The monomer concentration in the thus-formed aqueous solution was 45%. Then, 0.1 g of potassium persulfate was added and dissolved in the aqueous solution, and nitrogen gas was blown into the solution to expel oxygen present in the solution. The aqueous solution in the Erlenmeyer flask was dispersed in the contents of the 4-neck flask, and the mixture was agitated for 6 hours on a warm water bath while introducing nitrogen in the interior of the flask and maintaining the internal temperature at 60° to 65° C. When the agitation was stopped, there was obtained a suspension from which the resulting swollen polymer particles readily sedimented and separated. The n-hexane was removed by distillation under reduced pressure, and the residual swollen polymer was dried at 30° to 80° C under reduced pressure. The polymer was obtained in the form of a powder containing some agglomerated masses which could readily be pulverized by pressing with a finger. The particle size of the primary particles of the resulting polymer powder was in the range of 0.01 to 0.08 mm, and the average particle size was 0.05 mm. The water absorption of the resulting polymer was about 500 g. At the time of the measurement of the water absorption, the filterability of the polymer was very good and no stickiness was observed. The pH value of a slurry containing 0.25 wt.% of this polymer was 7.4.

EXAMPLE 2

A powdery polymer was prepared in the same manner as described in Example 1 except that the amount of water used for formation of the aqueous phase was changed to 49 g, namely the monomer concentration in the aqueous phase was changed to 40%.

The water absorption of the resulting polymer was about 400 g, and the particle size of the polymer was in the range of 0.01 to 0.08 mm and the average particle size was 0.04 mm.

The polymerization was repeated under the same conditions except that the amount used of water was increased to change the monomer concentration in the aqueous phase to 35 wt.%. When the resulting polymer was placed in water, it was in a semi-dissolved state and the water absorption could not be measured.

EXAMPLE 3

A powdery polymer was prepared in the same manner as described in Example 1 except that the amounts used of 93% sodium hydroxide and water in the aqueous phase were changed to 12.5 g and 35 g, respectively, whereby the neutralization degree of the acrylic acid was changed to 70% and the monomer concentration in the aqueous phase was changed to 47%.

The water absorption of the resulting polymer was about 400 g, and the pH value of a slurry containing 0.25 wt.% of this polymer was 7.1. The particle size of the polymer was in the range of 0.01 to 0.08 mm and the average particle size was 0.04 mm.

COMPARATIVE EXAMPLE 4

A polymer was prepared in the same manner as described in Example 1 except that 0.03 g of N,N'-methylene-bis(acrylamide) was added as a crosslinking agent to the aqueous solution of sodium acrylate (0.1% by weight based on the acrylic acid). The water absorption of the resulting polymer was only 180 g. The particle size of the polymer was in the range of from 0.01 to 0.08 mm and the average particle size was 0.04 mm.

COMPARATIVE EXAMPLE 5

A polymer was prepared in the same manner as described in Example 1 except that 0.006 g of N,N'-methylene-bis(acrylamide) was added as a crosslinking agent to the aqueous solution of sodium acrylate. The water absorption of the resulting polymer was 220 g. The particle size of the polymer was in the range of 0.01 to 0.08 mm and the average particle size was 0.04 mm.

EXAMPLE 4

A powdery polymer was prepared in the same manner as in Example 1 except that commercially available ligroin of the special grade (containing more than 90% by volume of fractions boiling at 80° to 110° C) was used instead of n-hexane.

The water absorption of the resulting polymer was 450 g. The particle size of the polymer was in the range of 0.01 to 0.8 mm and the average particle size was 0.05 mm.

COMPARATIVE EXAMPLES 6 to 8

Polymerization was tried under the same conditions as described in Example 1 by using instead of n-hexane, commercially available special grade benzene, toluene and xylene separately.

In each case, gelation occurred midway through the reaction, and further progress of the reaction became impossible.

COMPARATIVE EXAMPLE 9

An acrylamide-sodium acrylate copolymer was prepared in the same manner as described in Example 1 by using sodium acrylate formed by neutralizing 12 g of acrylic acid by 5.4 g of sodium hydroxide, 33.4 g of acrylamide, 0.02 g of potassium persulfate, 30 g of water, 220 ml of ligroin and 2.4 g of sorbitan monostearate. The water absorption of the resulting copolymer was only 240 g. The particle size of the resulting copolymer was in the range of 0.01 to 0.08 mm and the average particle size was 0.04 mm.

COMPARATIVE EXAMPLE 10

A polymer was prepared in the same manner as described in Example 1 except that oil-soluble benzoyl peroxide was used instead of water-soluble potassium persulfate. Since benzoyl peroxide is insoluble in water, it was dissolved in the n-hexane phase. The reaction progressed at a slower rate than in Example 1, and with advance of the reaction, adhesion of a gel to the wall of the reaction vessel took place. The remaining portion was a stable emulsion. Distillation of the solvent from the emulsion gave a water-insoluble film. Thus, it was confirmed that when an oil-soluble polymerization initiator is used, the water-absorbing powdery polymer desired in the present invention cannot be obtained.

The reason why the properties of a polymer prepared by using a water-soluble initiator are different from those of a polymer prepared by using an oil-soluble initiator as illustrated in Example 1 and Comparative Example 1 is considered to be as follows.

In case of the water-soluble initiator, radical species formed from the initiator dissolved in the fine liquid droplets dispersed in the oil phase attack the monomer similarly dissolved in the fine droplets thereby to initiate the polymerization. Namely, the polymerization progresses in the liquid droplets, i.e., in the aqueous phase, and the polymerization is conducted according to the so-called suspension polymerization process.

On the other hand, in case of the oil-soluble initiator, the neutralized monomer, namely the sodium salt, is entirely present in the form of an aqueous solution in liquid droplets, and the unneutralized portion is distributed in both the liquid droplets, i.e., the aqueous phase, and the organic solvent phase. Since the initiator was dissolved only in the organic solvent, radical species formed from the initiator attack the monomer dissolved in the oil phase. In other words, polymerization of the unneutralized portion progresses in the oil phase solvent. Some of the radical species formed in the oil phase diffuse into the liquid droplets to cause polymerization of the monomer in the liquid droplets according to the so-called emulsion polymerization process.

In short, the former initiator causes suspension polymerization and the latter initiator causes emulsion polymerization. Therefore, the differences of properties are brought about between the polymer prepared by using the former initiator and the polymer prepared by using the latter initiator.

EXAMPLE 5

A polymer was prepared in the same manner as described in Example 1 except that 1.8 g of sorbitan sesquioleate having an HLB value of 3.7 was used instead of sorbitan monostearate.

The water absorption of the resulting polymer was 480 g.

EXAMPLE 6

A polymer was prepared in the same manner as described in Example 1 except that 3.0 g of sorbitan monooleate having an HLB value of 4.3 was used instead of sorbitan monostearate.

The water absorption of the resulting polymer was 400 g.

The embodiments of the invention in which an exclusive property or privilege is claimed are defined as follows:

1. A process for the preparation of powdery, spontaneously crosslinked, alkali metal acrylate homopolymer having a water absorption capacity of at least 400 grams per one gram of dried polymer, said process comprising dispersing and suspending an aqueous solution of an alkali metal acrylate having a concentration of at least 40% by weight and containing a water-soluble radical polymerization initiator in a liquid aliphatic hydrocarbon solvent, in the presence of a sorbitan fatty acid ester having an HLB value of 3 to 6, and polymerizing the alkali metal acrylate in the absence of a crosslinking agent.

2. A process for the preparation of alkali metal acrylate polymer according to claim 1 wherein the alkali metal acrylate is one prepared by neutralizing 50 to 95% of acrylic acid with an alkali metal hydroxide.

3. A process for the preparation of alkali metal acrylate polymer according to claim 2 wherein the alkali metal hydroxide is sodium hydroxide.

4. A process for the preparation of alkali metal acrylate polymer according to claim 1 wherein the sorbitan fatty acid ester is sorbitan monostearate.

5. A process for the preparation of alkali metal acrylate polymer according to claim 1 wherein the aliphatic hydrocarbon is n-hexane.

6. A process for the preparation of alkali metal acrylate polymer according to claim 1 wherein an aqueous solution of an alkali metal acrylate having a concentration ranging from 40% by weight to the saturated concentration thereof in water, said solution containing potassium or ammonium persulfate in an amount of 0.01 to 1% by weight, based on the weight of the alkali metal acrylate monomer, is dispersed and suspended in n-hexane in the presence of sorbitan monostearate, the alkali metal acrylate monomer is polymerized in this state, and n-hexane and water are removed and the residue is dried to obtain a powdery polymer.

7. A powdery, crosslinked, alkali metal acrylate homopolymer prepared by the process of claim 1 and having a particle size in the range of from 0.01 to 0.12 mm.